(12) United States Patent
Sun et al.

(10) Patent No.: US 11,294,964 B2
(45) Date of Patent: Apr. 5, 2022

(54) METHOD AND SYSTEM FOR SEARCHING NEW MEDIA INFORMATION

(71) Applicant: ALIBABA GROUP HOLDING LIMITED, Grand Cayman (KY)

(72) Inventors: Liansheng Sun, Hangzhou (CN); Zhenxin Ma, Hangzhou (CN); Yongjin Wang, Hangzhou (CN); Kui Xiong, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 58 days.

(21) Appl. No.: 16/700,913

(22) Filed: Dec. 2, 2019

(65) Prior Publication Data

US 2020/0175079 A1    Jun. 4, 2020

(30) Foreign Application Priority Data

Dec. 3, 2018 (CN) .......................... 201811466746.6

(51) Int. Cl.
  *G06F 16/903* (2019.01)
  *G06F 40/205* (2020.01)
  *G06F 16/9035* (2019.01)
  *G06F 16/9032* (2019.01)

(52) U.S. Cl.
  CPC .... *G06F 16/90348* (2019.01); *G06F 16/9032* (2019.01); *G06F 16/9035* (2019.01); *G06F 40/205* (2020.01)

(58) Field of Classification Search
  None
  See application file for complete search history.

(56) References Cited

U.S. PATENT DOCUMENTS

| 6,052,716 | A | 4/2000 | Gibson |
| 6,085,226 | A | 7/2000 | Horvitz |
| 6,633,316 | B1 | 10/2003 | Maddalozzo, Jr. et al. |
| 6,920,505 | B2 | 7/2005 | Hals et al. |
| 6,999,959 | B1 | 2/2006 | Lawrence et al. |
| 7,003,506 | B1 | 2/2006 | Fisk et al. |
| 7,606,794 | B2 | 10/2009 | Carson et al. |
| 8,725,729 | B2 | 5/2014 | Lisa et al. |
| 8,762,360 | B2 | 6/2014 | Jiang et al. |
| 8,788,502 | B1 * | 7/2014 | Hensel ................. G06F 16/951 707/738 |

(Continued)

OTHER PUBLICATIONS

PCT International Search Report and the Written Opinion dated Feb. 18, 2020, issued in related International Application No. PCT/US2019/064042 (10 pages).

*Primary Examiner* — Son T Hoang

(57) ABSTRACT

Provided here are methods, systems, and apparatus, including computer programs encoded on computer storage media, for searching new media information using search engine. One of the methods includes: receiving search information input by a user using a search engine, and sending the search information to a server; obtaining, from a search result returned by the server, element data of new media information related to the search information; and displaying, in a current search result page of the search engine, the element data of the new media information in a new media display format, wherein the element data is data that is directly displayable without a page jump in response to an operation of the user on the element data.

16 Claims, 7 Drawing Sheets

(56) References Cited

U.S. PATENT DOCUMENTS

| | | | |
|---|---|---|---|
| 9,141,672 B1 | 9/2015 | Popovici et al. | |
| 9,213,745 B1* | 12/2015 | Benitez | G06F 16/48 |
| 9,684,718 B2 | 6/2017 | Bao et al. | |
| 2003/0120649 A1 | 6/2003 | Uchino et al. | |
| 2004/0059720 A1* | 3/2004 | Rodriguez | G06F 16/438 |
| 2005/0114324 A1 | 5/2005 | Mayer | |
| 2005/0203795 A1 | 9/2005 | Witzenburg | |
| 2008/0005070 A1 | 1/2008 | Malik | |
| 2008/0177994 A1 | 7/2008 | Mayer | |
| 2009/0210403 A1* | 8/2009 | Reinshmidt | G06F 16/907 |
| 2009/0313237 A1* | 12/2009 | Agrawal | G06F 16/3322 |
| 2011/0035374 A1* | 2/2011 | Vadrevu | G06F 16/951 |
| | | | 707/728 |
| 2012/0315009 A1 | 12/2012 | Evans et al. | |
| 2013/0166303 A1 | 6/2013 | Chang et al. | |
| 2016/0042035 A1* | 2/2016 | Ajmera | G06F 16/2228 |
| | | | 707/722 |
| 2016/0371379 A1* | 12/2016 | Fang | G06F 16/951 |
| 2017/0357647 A1* | 12/2017 | Fiero | G06F 16/27 |
| 2018/0246983 A1* | 8/2018 | Rathod | G06F 16/9535 |

\* cited by examiner

S101 Receive search information input by a user using a search engine, and send the search information to a server S102 Obtain, from a search result returned by the server, element data of new media information related to the search information S103 Display, in a current search result page of the search engine, the element data of the new media information in a new media display format

FIG. 1

 Heated discussion in Sina

Sina Entertainment
Sina Entertainment brings you the freshest entertainment information
Stan Lee died# Martial arts without Jin Yong, Marvel Comics without Stan Lee, superheroes without fathers... Thank you for creating a magnificent universe for us in your lifetime. May you in another world...

   

Two days ago      Forwarding times: 5245 Comments (1297)

 Pear Video
Short video platform for information
[Goodbye, Marvel Comics great Stan Lee! 140 seconds to review Stan Lee's 42 guest films. On November 12 local time, Stan Lee, Marvel Comics great Stan Lee died at the age of 95. Stan Lee is a veteran of cartoons...

Second shot video of Micro Spicy Video

One day ago      Forwarding times: 1,8000 Comments (1,2000)

View more

FIG. 2

METHOD AND SYSTEM FOR SEARCHING NEW MEDIA INFORMATION

CROSS REFERENCE TO RELATED APPLICATION

The present application is based on and claims priority to Chinese Patent Application No. 201811466746.6, filed on Dec. 3, 2018, the entire contents of which are incorporated herein by reference in the entirety.

TECHNICAL FIELD

Embodiments of the present application relate to the field of Internet technologies, and in particular, to new media information displaying method, device, electronic device, and computer readable medium.

BACKGROUND

In an era of rapid development of the Internet, many new media resources such as microblog (e.g., twitter, weibo), Zhihu (a question-and-answer online media where all kinds of questions are created, answered, edited, and organized by the community of its users), and other new media emerge. Different from the traditional media, new media enables faster information dissemination and contains more detailed information, and has more content discussions and comment information. Compared to traditional document webpages, new media have more content and can gain popularity from users.

However, in a traditional search engine, since there is no such new media resource or recording and displaying of such new media, a user cannot discover these new media, and cannot obtain faster and more detailed new media information. Consequently, cutting-edge search experience cannot be obtained.

SUMMARY

New media information displaying methods, devices, electronic devices, and computer readable media are disclosed, to address the problem in existing technologies that the lack of new media information related to search information in a search engine for viewing causes poor user search experience.

According to a first aspect, a method for displaying new media information is provided. The method includes: receiving search information input by a user using a search engine, and sending the search information to a server; obtaining, from a search result returned by the server, element data of new media information related to the search information; and displaying, in a current search result page of the search engine, the element data of the new media information in a new media display format, where the element data is data that is directly displayable without a page jump in response to an operation of the user on the element data.

According to a second aspect, a method for displaying new media information is provided. The method includes: receiving search information sent by a search engine input by a user; determining a search result associated with the search information; and transmitting the search result to the search engine, for the search engine to obtain, from the search result, element data of new media information related to the search information, and to display, in a current search result page, the element data of the new media information in a new media display format, where the element data is data that is directly displayable without a page jump in response to an operation of the user on the element data.

According to a third aspect, a device for displaying new media information is provided. The device includes: a sending module configured to: receive search information input by a user using a search engine, and send the search information to a server; an obtaining module configured to obtain, from a search result returned by the server, element data of new media information related to the search information; and a first displaying module configured to display, in a current search result page of the search engine, the element data of the new media information in a new media display format, where the element data is data that is directly displayable without a page jump in response to an operation of the user on the element data.

According to a fourth aspect, a device for displaying new media information is provided. The device includes: a receiving module configured to receive search information sent by a search engine input by a user; a first determining module configured to determine a search result associated with the search information; and a transmitting module configured to transmit the search result to the search engine, for the search engine to obtain, from the search result, element data of new media information related to the search information, and to display, in a current search result page, the element data of the new media information in a new media display format, where the element data is data that is directly displayable in response to an operation of the user on the element data.

According to a fifth aspect, an electronic device is provided, including: one or more processors, and a computer readable medium configured to store one or more programs; when the one or more programs are executed by the one or more processors, the one or more processors implementing the method for displaying new media information according to the foregoing first aspect or second aspect of the embodiments.

According to a sixth aspect, a computer readable medium is provided, a computer program being stored thereon, when the program is executed by a processor, the processor implementing method for displaying new media information according to the first aspect or the second aspect of the following embodiments.

According to a seventh aspect, a non-transitory computer-readable storage medium for displaying new media information is configured with instructions executable by one or more processors to cause the one or more processors to perform operations comprising: receiving search information input by a user using a search engine, and sending the search information to a server; obtaining, from a search result returned by the server, element data of new media information related to the search information; and displaying, in a current search result page of the search engine, the element data of the new media information in a new media display format, wherein the element data is data that is directly displayable without a page jump in response to an operation of the user on the element data.

According to an eighth aspect, a system for displaying new media information comprises one or more processors and one or more non-transitory computer-readable memories coupled to the one or more processors and configured with instructions executable by the one or more processors to cause the system to perform operations comprising: receiving search information input by a user using a search engine, and sending the search information to a server; obtaining, from a search result returned by the server, element data of new media information related to the search information; and displaying, in a current search result page of the search engine, the element data of the new media information in a new media display format, wherein the element data is data that is directly displayable without a page jump in response to an operation of the user on the element data.

According to a ninth aspect, a non-transitory computer-readable storage medium for displaying new media information is configured with instructions executable by one or more processors to cause the one or more processors to perform operations comprising: receiving search information sent by a search engine input by a user; determining a search result associated with the search information; and transmitting the search result to the search engine, for the search engine to obtain, from the search result, element data of new media information related to the search information, and to display, in a current search result page, the element data of the new media information in a new media display format, wherein the element data is data that is directly displayable without a page jump in response to an operation of the user on the element data.

According to a tenth aspect, a system for displaying new media information comprises one or more processors and one or more non-transitory computer-readable memories coupled to the one or more processors and configured with instructions executable by the one or more processors to cause the system to perform operations comprising: receiving search information sent by a search engine input by a user; determining a search result associated with the search information; and transmitting the search result to the search engine, for the search engine to obtain, from the search result, element data of new media information related to the search information, and to display, in a current search result page, the element data of the new media information in a new media display format, wherein the element data is data that is directly displayable without a page jump in response to an operation of the user on the element data.

In the technical solutions provided in the embodiments of the present specification, the search information input by the user using the search engine is received, and the search information is sent to the server; the element data of the new media information related to the search information is obtained from the search result returned by the server; and then the element data of the new media information is displayed in the current search result page of the search engine in the new media display format, where the element data is data that is directly displayable without a page jump in response to the operation of the user on the element data. In some embodiments, the new media information related to the search information input by the user using the search engine can be integrated, and the element data of the new media information is displayed in the new media display format, helping the user to view faster and more detailed new media information related to the search information, thereby improving search experience of the user.

BRIEF DESCRIPTION OF THE DRAWINGS

FIG. 1 is a flowchart of steps of a method for displaying new media information according to some embodiments;

FIG. 2 is a schematic diagram of an interface for displaying new media information according to some embodiments;

DETAILED DESCRIPTION

Figure 3:
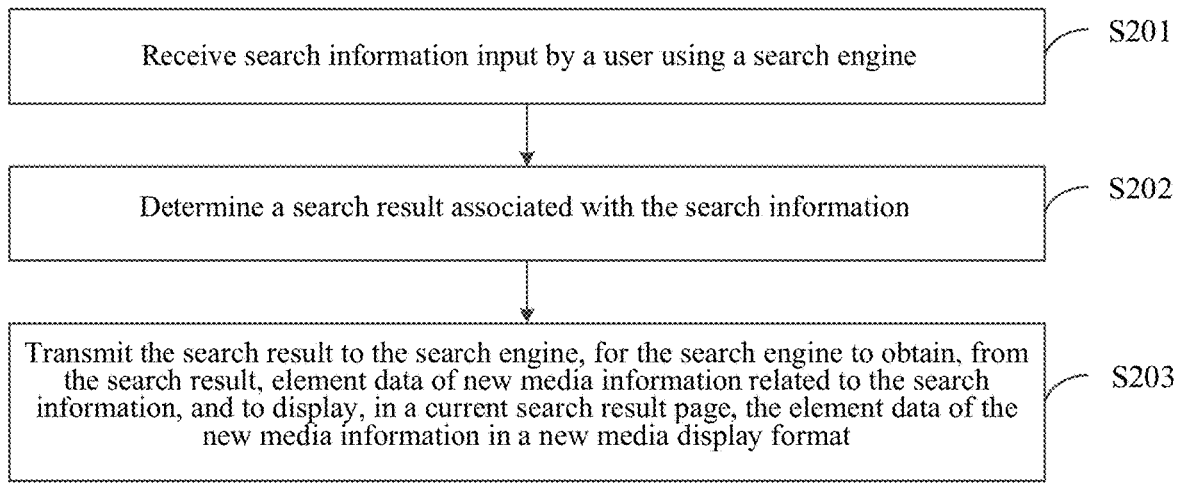
FIG. 3 is a flowchart of steps of a method for displaying new media information according to some embodiments.

The embodiments in the present specification and features in the embodiments may be combined with each other. The present specification is described in detail below with reference to the accompanying drawings and the embodiments.

In existing technologies, since the traditional search engine has no similar new media resource nor recording and displaying of similar new media, a user cannot discover these new media, and cannot obtain faster and more detailed new media information. Consequently, up-to-date search experience cannot be obtained.

Referring to FIG. 1, a flowchart of steps of a method for displaying new media information according to some embodiments is shown.

In some embodiments, the method for displaying new media information is described from a perspective of a search engine. For example, the method for displaying new media information includes the following steps.

In step S101, search information input by a user using a search engine is received, and the search information is sent to a server.

In some embodiments, the search engine receives the search information input by the user using a search box of the search engine. The search information may include a search keyword, a search phrase, and the like. The search keyword may include, but is not limited to Chinese words, English words, and pictures. The foregoing description is merely an example, and no limitation is imposed.

In some embodiments, when receiving the search information input by the user using the search engine, the search engine receives a search operation input by the user using the search box of the search engine, and obtains the search information input using the search operation. Any implementation of receiving the search information input by the user using the search engine may be applied to the present specification, and no limitation is imposed.

In some embodiments, after receiving the search information input by the user using the search engine, the search engine sends a new media information displaying request to the server, the new media information displaying request carrying the search information. The foregoing description is merely an example, and no limitation is imposed.

In step S102, element data of new media information related to the search information is obtained from a search result returned by the server.

In some embodiments, the search result includes new media information that matches the search information or the element data obtained after parsing the new media information that matches the search information. In some embodiments, new media are forms of media that are native to computers, computational and rely on computers for redistribution. Some examples of new media are telephones, computers, virtual worlds, single media, website games, human-computer interface, computer animation and interactive computer installations. New media are often contrasted to "old media", such as television, radio, and print media. For example, the new media information may comprise media information emerging on the Internet other than webpage documents, such as information in microblog, Zhihu, and other media. The element data is data that is directly displayable without a page jump in response to an operation of the user on the element data, and the element data includes text data of new media and/or rich media data of new media. The text data of the new media includes at least one of the following: a title of the new media, a content body of the new media, comment information of the new media, and interactive question-and-answer information of the new media. The rich media data of the new media includes at least one of the following: an image of the new media and a video frame sequence of the new media. For example, the rich media data of the new media may comprise media information data other than texts, such as a static picture, a dynamic picture, a short video, and a long video. The interactive question-and-answer information of the new media may comprise content information of a user discussion about the new media. The image of the new media may include a static image and a dynamic image of the new media. The video frame sequence of the new media may include a short video and a long video of the new media. When a user taps an image of the new media displayed in a current search result page of the search engine, the user can directly preview the image of the new media without a page jump. When the user taps a video frame sequence of the new media displayed in the current search result page of the search engine, the user can directly watch a played video frame sequence without a page jump. Therefore, the user views a richer and more varied content of the new media information related to the search information. The foregoing description is merely an example, and no limitation is imposed.

In some optional embodiments, when the search result includes the new media information that matches the search information, that element data of new media information related to the search information is obtained from a search result returned by the server includes: analyzing the search result returned by the server, and parsing the element data from the new media information in response to determining according to an analysis result that the search result corresponds to the new media information. Any implementation of obtaining the element data of the new media information from the search result returned by the server may be applied to the present specification, and no limitation is imposed.

In one example, during analyzing of the search result returned by the server, a related field in the search result returned by the server is analyzed, and it is determined according to an analysis result whether the search result is the new media information. The element data is parsed from the related field of the new media information in response to determining according to the analysis result that the search result corresponds to the new media information. The foregoing description is merely an example, and no limitation is imposed.

In some optional embodiments, when the search result includes the element data obtained after the new media information that matches the search information is parsed, that element data of new media information related to the search information is obtained from a search result returned by the server includes: receiving the search result returned by the server, and obtaining the element data of the new media information from the search result. Any implementation of obtaining the element data of the new media information from the search result returned by the server may be applied to the present specification, and no limitation is imposed.

In step S103, the element data of the new media information is displayed in a current search result page of the search engine in a new media display format.

In some optional embodiments, during displaying, in the new media display format, of the element data of the new media information in the current search result page of the search engine, the text data of the new media is displayed in a first display area of a new media display area of the current search result page in a first specified format; and the rich media data of the new media is displayed in a second display area of a new media display area of the current search result page in a second specified format. Therefore, the text data and the rich media data of the new media can be respectively displayed in different display areas in the new media display area, helping the user to view the new media information related to the search information, thereby improving search experience of the user about the search engine. Any implementation of displaying, in the new media display format, the element data of the new media information in the current search result page of the search engine may be applied to the present specification, and no limitation is imposed.

In one example, the first specified format may be successively displaying a title of the new media, a content body of the new media, comment information of the new media, and interactive question-and-answer information of the new media in the first display area, and the second specified format may be successively displaying a video frame sequence of the new media and an image of the new media in the second display area. The foregoing description is merely an example, and no limitation is imposed.

In one example, as shown in FIG. 2, two pieces of new media information are included. In first new media information, the text data of the new media includes a title and comment information of the new media, and the rich media data of the new media includes images of the new media. The title and the comment information of the new media are collectively displayed in an upper area in a display area of the first new media information, and the images of the new media are collectively displayed in a lower area in the display area of the first new media information. In addition, a number of times the first new media information is forwarded (e.g., reposted, retweeted) and a quantity of comment information associated with the first new media information are further displayed. When a user taps the image of the new media, the user can directly preview the image of the new media without a page jump. In addition, because the title and the comment information of the new media cannot be fully displayed in the upper area in the display area of the first new media information, a full text pull-down button is further displayed. When the user taps the full text pull-down button, the title and the comment information of the new media can be fully displayed without a page jump. In second new media information, the text data of the new media includes a title and a content body of the new media, and the rich media data of the new media includes video frame sequences of the new media. The title and the content body of the new media are collectively displayed in an upper area in a display area of the second new media information, and the video frame sequences of the new media are collectively displayed in a lower area in the display area of the second piece of new media information. In addition, a number of times the second new media information is forwarded and a quantity of comment information associated with the second new media information are further displayed. In addition, because the title and the content body of the new media cannot be fully displayed in the upper area in the display area of the second new media information, a full text pull-down button is further displayed. When the user taps the full text pull-down button, the title and the content body of the new media can be fully displayed without a page jump. When a user taps the video frame sequence of the new media, the video frame sequence of the new media can be directly played without a page jump. The foregoing description is merely an example, and no limitation is imposed.

In the method for displaying new media information provided in some embodiments, the search information input by the user using the search engine is received, and the search information is sent to the server; the element data of the new media information related to the search information is obtained from the search result returned by the server; and the element data of the new media information is displayed in the current search result page of the search engine in the new media display format, and the element data is data that is directly displayable without a page jump in response to an operation of the user on the element data. In some embodiments, the new media information related to the search information input by the user using the search engine can be integrated, and the element data of the new media information is displayed in the new media display format, helping the user to view faster and more detailed new media information related to the search information, thereby improving search experience of the user.

The method for displaying new media information may be executed by any suitable apparatus having a data processing capability, including but not limited to: a camera, a terminal, a mobile terminal, a PC, a server, an in-vehicle device, an entertainment device, an advertising device, a personal digital assistant (PDA), a tablet computer, a notebook computer, a handheld game console, smart glasses, a smart watch, a wearable device, a virtual displaying device, and a display enhancement device (such as Google Glass, Oculus Rift, Hololens, and Gear VR), etc.

Referring to FIG. 3, a flowchart of steps of a method for displaying new media information according to some embodiments is shown.

In some embodiments, the method for displaying new media information provided in some embodiments is described from a perspective of a server. In particular, the method for displaying new media information includes the following steps.

In step S201, search information input by a user using a search engine is received.

In some embodiments, the server receives a new media information displaying request sent by the search engine, the new media information displaying request carrying the search information input by the user using the search engine. The foregoing description is merely an example, and no limitation is imposed.

In step S202, a search result associated with the search information is determined.

In some embodiments, the search result includes new media information that matches the search information or the element data obtained after parsing the new media information that matches the search information. The foregoing description is merely an example, and no limitation is imposed.

In some optional embodiments, before that the new media information that matches the search information is determined, the method further includes: crawling the new media information in a new media service website using a web crawler; storing the crawled new media information; and establishing an index relationship between a title of new media included in the new media information and the new media information. Therefore, the index relationship between the title of new media and the new media information can be established, helping to retrieve the new media information related to the search information input by the user using the search engine from vast new media information. The foregoing description is merely an example, and no limitation is imposed.

In some optional embodiments, that a search result associated with the search information is determined includes: determining the new media information that matches the search information. During determining of the new media information that matches the search information, it is determined that the new media information matches the search information in response to determining that the search information matches the title of the new media included in the new media information. Therefore, the new media information that matches the search information can be accurately determined. Any implementation of determining the new media information that matches the search information may be applied to the present specification, and no limitation is imposed.

In some optional embodiments, before that it is determined that the new media information matches the search information, the method further includes: segmenting the title of the new media to determine segmented words of the title of the new media; segmenting a content of the search information to determine segmented words of the search information; and determining that the search information matches the title of the new media if the segmented words of the title of the new media include the segmented words of the search information. Therefore, it can be accurately determined that the search information matches the title of the new media. The foregoing description is merely an example, and no limitation is imposed.

In some optional embodiments, after the segmenting a content of the search information to determine segmented words of the search information, the method further includes: performing stop word filtering on the segmented words of the search information, to obtain filtered segmented words; and determining that the search information matches the title of the new media if the segmented words of the title of the new media include the filtered segmented words. Therefore, it can be more accurately determined that the search information matches the title of the new media. The foregoing description is merely an example, and no limitation is imposed.

In one example, stop word filtering is filtering out a meaningless word in the segmented words of the search information, such as an auxiliary word, a number, etc. In an example of an implementation, a stop word lexicon may be pre-established for matching, and a stop word is filtered. Stop word filtering may further include: removing a word that has little to do with the meaning of the search information such as polite expressions (for example, excuse me, etc.), auxiliary words (be of, what, how, ah, etc.), etc. The foregoing descriptions are merely examples, and no limitation is imposed.

In some optional embodiments, before that it is determined that the new media information matches the search information, the method further includes: segmenting the title of the new media to determine segmented words of the title of the new media; generating, based on the segmented words of the title of the new media, a vector representing the title of the new media; segmenting a content of the search information to determine segmented words of the search information; generating, based on the segmented words of the search information, a vector representing the search information; determining a similarity between the title of the new media and the search information based on the vector representing the title of the new media and the vector representing the search information; and determining that the title of the new media matches the search information if the similarity between the title of the new media and the search information is greater or equal to a preset similarity threshold. The preset similarity threshold may be set by a person skilled in the art according to an actual requirement, and no limitation is imposed. Therefore, it can be accurately determined that the search information matches the title of the new media. The foregoing description is merely an example, and no limitation is imposed.

In some optional embodiments, after that the new media information that matches the search information is determined, the method further includes: ranking the new media information based on a quantity of comments associated with the new media information, to determine a ranking result of the new media information; ranking the new media information based on a number of times the new media information is forwarded, to determine a ranking result of the new media information; ranking the new media information based on a type of rich media data included in the new media information, to determine a ranking result of the new media information; ranking the new media information based on a publishing time of the new media information, to determine a ranking result of the new media information; determining a similarity between the search information and a title of new media included in the new media information, and ranking the new media information based on the search information and the title of the new media, to determine a ranking result of the new media information; or determining a similarity between the search information and a content body of new media included in the new media information, and ranking the new media information based on the similarity between the search information and the content body of the new media, to determine a ranking result of the new media information. Therefore, the new media information can be ranked according to ranking feature parameters of different dimensions (such as the quantity of comments associated with the new media information, the number of times the new media information is forwarded, a type of rich media data included in the new media information, the publishing time of the new media information, the similarity between the search information and the title of the new media, and the similarity between the search information and the content body of the new media), so that accuracy of the ranking result of the new media information can be improved. The foregoing description is merely an example, and no limitation is imposed.

In one example, a larger quantity of comments associated with the new media information indicates a higher ranking of the new media information, and a smaller quantity of comments associated with the new media information indicates a lower ranking of the new media information. A larger number of times the new media information is forwarded indicates a higher ranking of the new media information, and a smaller quantity of the new media information is forwarded indicates a lower ranking of the new media information. The type of rich media data included in the new media information includes at least one of: an image, a video frame sequence, and an article link. More types of rich media data included in the new media information indicate a higher ranking of the new media information, and fewer types of rich media data included in the new media information indicate a lower ranking of the new media information. If the quantities of types of the rich media data included in the new media information are the same, new media information with rich media data whose type is a video frame sequence is ranked higher than new media information with rich media data whose type is an image, and new media information with rich media data whose type is an image is ranked higher than new media information with rich media data whose type is an article link. An earlier publishing time of the new media information indicates a higher ranking of the new media information, and a later publishing time of the new media information indicates a lower ranking of the new media information. A higher similarity between the search information and the title of the new media indicates a higher ranking of corresponding new media information, and a lower similarity between the search information and the title of the new media indicates a lower ranking of corresponding new media information. A higher similarity between the search information and the content body of the new media indicates a higher ranking of corresponding new media information, and a lower similarity between the search information and the content body of the new media indicates a lower ranking of corresponding new media information. The foregoing description is merely an example, and no limitation is imposed.

In some optional embodiments, during the determining of the similarity between the search information and the title of the new media included in the new media information, the title of the new media is segmented to obtain segmented words of the title of the new media; a first vector representing the title of the new media is generated based on the segmented words of the title of the new media; a content of the search information is segmented to determine segmented words of the search information; a second vector representing the search information is generated based on the segmented words of the search information; and the similarity between the search information and the title of the new media is determined based on the first vector and the second vector. Therefore, the similarity between the search information and the title of the new media can be accurately determined. Any implementation of determining the similarity between the search information and the title of the new media included in the new media information may be applied to the present specification, and no limitation is imposed.

In one example, during the generating of the first vector representing the title of the new media, the first vector representing the title of the new media may be generated based on the segmented words of the title of the new media using a semantic vector generating model. During the generating of the second vector representing the search information is generated, the second vector representing the search information may be generated based on the segmented words of the search information using a semantic vector generating model. During the determining of the similarity between the search information and the title of the new media, a cosine similarity between the first vector and the second vector may be determined as the similarity between the search information and the title of the new media. The foregoing description is merely an example, and no limitation is imposed.

In some optional embodiments, during determining of the similarity between the search information and the content body of the new media included in the new media information is determined, a content of the search information is segmented to determine segmented words of the search information; a second vector representing the search information is generated based on the segmented words of the search information; the content body of the new media is segmented to determine segmented words of the content body of the new media; a third vector representing the content body of the new media is generated based on the segmented words of the content body of the new media; and the similarity between the search information and the content body of the new media is determined based on the second vector and the third vector. Therefore, the similarity between the search information and the content body of the new media can be accurately determined. Any implementation in which the similarity between the search information and the content body of the new media included in the new media information is determined can be applied to the present specification, and no limitation is imposed.

In one example, during determining of the second vector representing the search information, the second vector representing the search information may be generated based on the segmented words of the search information using a semantic vector generating model. During the determining of the third vector representing the content body of the new media, the third vector representing the content body of the new media may be generated based on the segmented words of the content body of the new media using a semantic vector generating model. During the determining of the similarity between the search information and the content body of the new media is determined, a cosine similarity between the second vector and the third vector may be determined as the similarity between the search information and the content body of the new media. The foregoing description is merely an example, and no limitation is imposed.

In some optional embodiments, after that the new media information that matches the search information is determined, the method further includes: ranking the new media information based on the quantity of comments associated with the new media information, the number of times the new media information is forwarded, the type of the rich media data included in the new media information, the publishing time of the new media information, the similarity between the search information and the title of the new media, and the similarity between the search information and the content body of the new media, to determine the ranking result of the new media information. Therefore, a plurality of ranking feature parameters of different dimensions can be combined to rank the new media information, thereby further improving the accuracy of the ranking result of the new media information. The foregoing description is merely an example, and no limitation is imposed.

In one example, a combined ranking score of each piece of new media information may be determined according to the following formula 1.

$$S = x_1*f_1 + w_2*f_2 + w_3*f_3 + w_4*f_4 + w_5*f_5 + w_6*f_6 \quad \text{Formula 1}$$

S represents the combined ranking score of the new media information, $f_1$ represents the quantity of comments associated with the new media information, and $w_1$ represents a weight value of the quantity of comments associated with the new media information, $f_2$ represents the number of times the new media information is forwarded, and $w_2$ represents a weight value of the quantity of the times the new media information is forwarded, $f_3$ represents the type of the rich media data included in the new media information, and $w_3$ represents a weight value of the type of the rich media data included in the new media information, $f_4$ represents the publishing time of the new media information, and $w_4$ represents a weight value of the publishing time of the new media information, $f_5$ represents the similarity between the search information and the title of the new media, and $w_5$ represents a weight value of the similarity between the search information and the title of the new media, $f_6$ represents the similarity between the search information and the content body of the new media, and $w_6$ represents a weight value of the similarity between the search information and the content body of the new media. $w_1$, $w_2$, $w_3$, $w_4$, $w_5$, and $w_6$ may be set by a person skilled in the art according to an actual requirement, and no limitation is imposed. After the combined ranking score of each piece of new media information is determined, the new media information may be ranked according to the combined ranking score of the new media information, to determine the ranking result of the new media information. The foregoing description is merely an example, and no limitation is imposed.

In step S203, the search result is transmitted to the search engine, for the search engine to obtain, from the search result, element data of new media information related to the search information, and to display, in a current search result page, the element data of the new media information in a new media display format.

In some optional embodiments, during transmitting of the search result to the search engine, the new media information is transmitted to the search engine based on the ranking result of the new media information, so that the search engine displays the new media information. Therefore, new media information highly associated with the search information input by the user can be displayed preferentially using the search engine. Any implementation of transmitting the new media information to the search engine to enable the search engine to display the new media information may be applied to the present specification, and no limitation is imposed.

In one example, N pieces of new media information ranked first are selected according to a ranking result of the new media information, and transmitted to the search engine, so that the search engine displays the N pieces of new media information ranked first. N may be set by a person skilled in the art according to an actual requirement, and no limitation is imposed. The foregoing description is merely an example, and no limitation is imposed.

In the method for displaying new media information provided in some embodiments, the search information input by the user using the search engine is received, the search result associated with the search information is determined, and then the search result is transmitted to the search engine, for the search engine to obtain, from the search result, the element data of the new media information related to the search information, and to display, in the current search result page, the element data of the new media information in the new media display format, where the element data is data that is directly displayable without a page jump in response to the operation of the user on the element data. In some embodiments, the new media information related to the search information input by the user using the search engine can be integrated, and the element data of the new media information is displayed in the new media display format, helping the user to view faster and more detailed new media information related to the search information, thereby improving search experience of the user.

The method for displaying new media information may be executed by any suitable device having a data processing capability, including but not limited to: a camera, a terminal, a mobile terminal, a PC, a server, an in-vehicle device, an entertainment device, an advertising device, a personal digital assistant (PDA), a tablet computer, a notebook computer, a handheld game console, smart glasses, a smart watch, a wearable device, a virtual displaying device, and a display enhancement device (such as Google Glass, Oculus Rift, Hololens, and Gear VR), etc.

Figure 4:
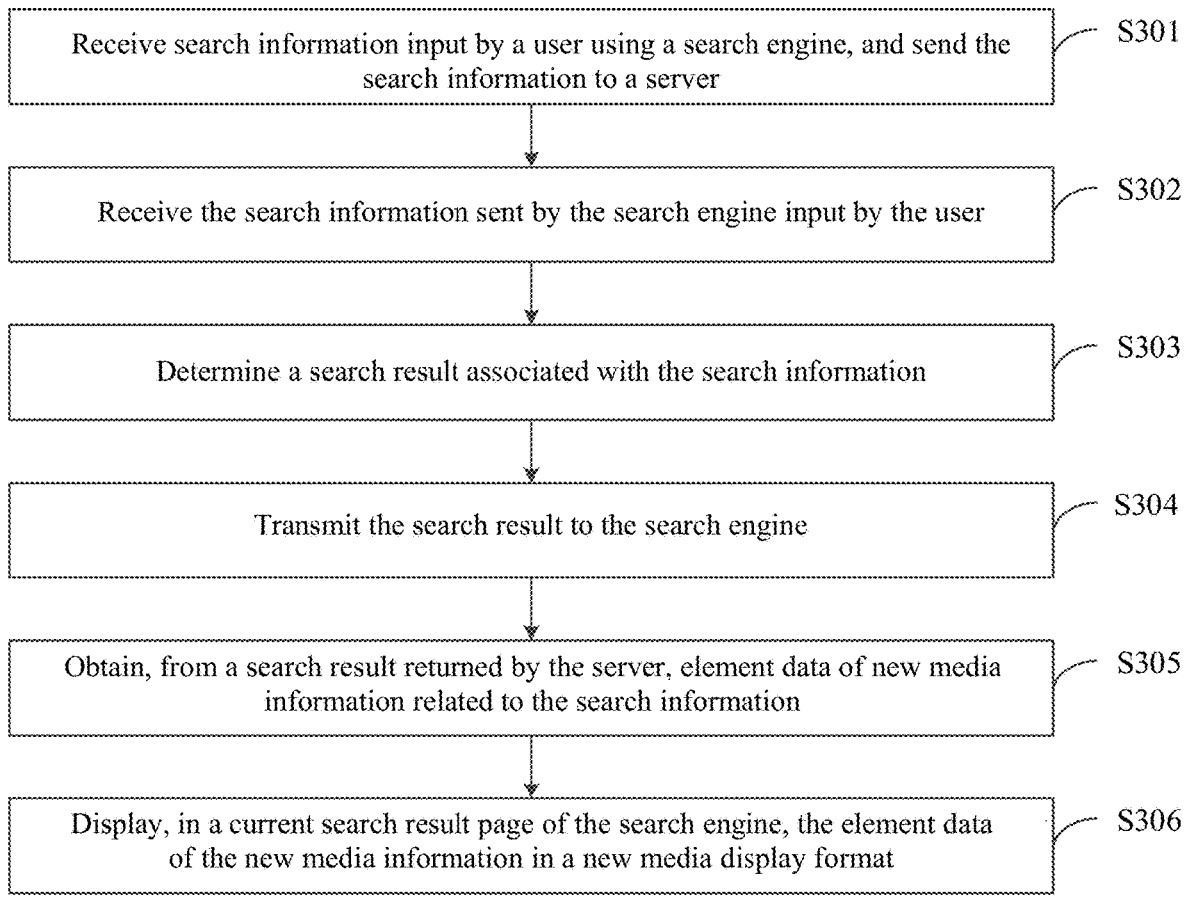
FIG. 4 is a flowchart of steps of a method for displaying new media information according to some embodiments.

Referring to FIG. 4, a flowchart of steps of a method for displaying new media information according to some embodiments is shown.

The method for displaying new media information provided in some embodiments is described from a perspective of interaction between a search engine and a server. For example, the method for displaying new media information includes the following steps.

In step S301, search information input by a user using a search engine is received, and the search information is sent to a server.

Because step S301 is similar to the foregoing step S101, details are not described herein again.

In step S302, the search information sent by the search engine input by the user is received.

Because step S302 is similar to the foregoing step S201, details are not described herein again.

In step S303, a search result associated with the search information is determined.

Because step S303 is similar to the foregoing step S202, details are not described herein again.

In step S304, the search result is transmitted to the search engine.

Because step S304 is similar to the foregoing step S203, details are not described herein again.

In step S305, element data of the new media information is obtained from the search result returned by the server.

Because step S305 is similar to the foregoing step S102, details are not described herein again.

In step S306, the element data of the new media information is displayed in a current search result page of the search engine in a new media display format.

In one example, when a user inputs search information "Apple launches a new phone" in a search box of the search engine, in a current search result page of the search engine, faster related product information and user comment information provided in microblog may be displayed, and a plurality of types of more detailed testing and evaluation information of the new phone of Apple provided in Zhihu may be displayed. The foregoing description is merely an example, and no limitation is imposed.

Figure 5:
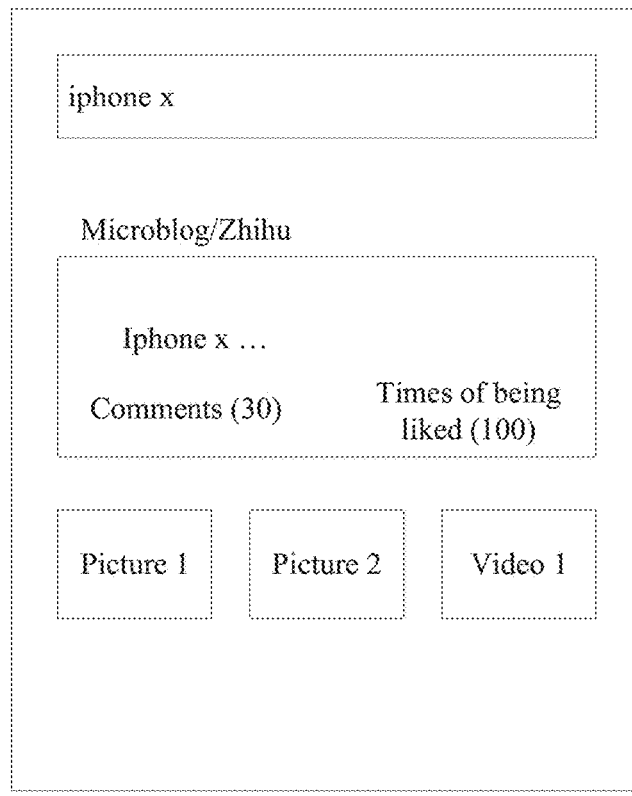
FIG. 5 is a schematic diagram of an interface for displaying new media information according to some embodiments.

In one example, as shown in FIG. 5, when a user inputs search information "iphone x" in a search box of the search engine, new media information related to iphone x provided in microblog or Zhihu may be displayed in a current search result page of the search engine. The rich media data of the new media includes an image and a video of the new media. Text data of the new media, a quantity of comment information associated with the new media information, and a number of times the new media information is liked are displayed in an upper area in a display area of the new media information, and the image and the video of the new media are displayed in a lower area in the display area of the new media information. When a user taps the image of the new media, the user can directly preview the image of the new media without a page jump. When a user taps the video of the new media, the user can directly watch the video of the new media without a page jump. The foregoing description is merely an example, and no limitation is imposed.

Figure 6:
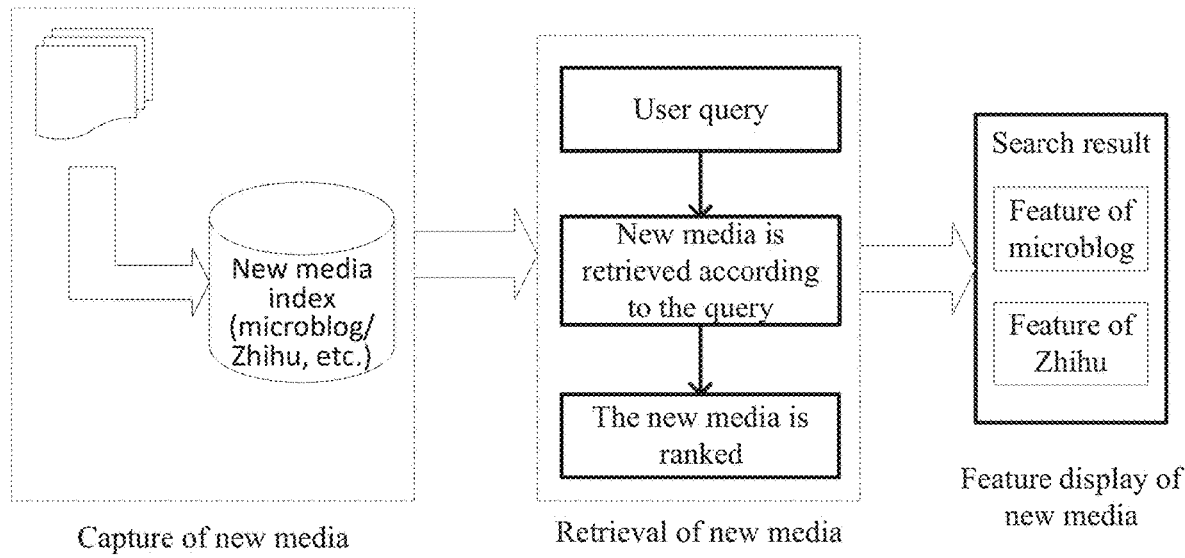
FIG. 6 is a schematic flowchart of a method for displaying new media information according to some embodiments.

In one example, as shown in FIG. 6, during implementation of the solutions for displaying new media information provided in some embodiments, the server first captures new media information in a new media service website of a network, and then stores captured new media information, and establishes a new media index according to the captured new media information. On this basis, the server receives a user query input by a user using a search engine, retrieves new media in the new media index according to the user query, and then ranks the retrieved new media, determines a ranking result of the retrieved new media, and sends the ranked new media to the search engine. The search engine displays the received new media information in a current search result page, for example, displays, in a specified display manner, new media information provided in microblog, and to display, in another specified display manner, new media information provided in Zhihu. The foregoing description is merely an example, and no limitation is imposed.

In the method for displaying new media information provided in some embodiments, the search engine receives the search information input by the user using the search engine, and sends the search information to the server. The server receives the search information input by the user using the search engine, determines the search result associated with the search information, and then transmits the search result to the search engine. The search engine obtains, from the search result, the element data of the new media information related to the search information, and displays, in the current search result page, the element data of the new media information in the new media display format, where the element data is data that is directly displayable without a page jump in response to an operation of the user on the element data. In some embodiments, the new media information related to the search information input by the user using the search engine can be integrated, and the element data of the new media information is displayed in the new media display format, helping the user to view faster and more detailed new media information related to the search information, thereby improving search experience of the user.

The method for displaying new media information may be executed by any suitable device having a data processing capability, including but not limited to: a camera, a terminal, a mobile terminal, a PC, a server, an in-vehicle device, an entertainment device, an advertising device, a personal digital assistant (PDA), a tablet computer, a notebook computer, a handheld game console, smart glasses, a smart watch, a wearable device, a virtual displaying device, and a display enhancement device (such as Google Glass, Oculus Rift, Hololens, and Gear VR), etc.

Figure 7:
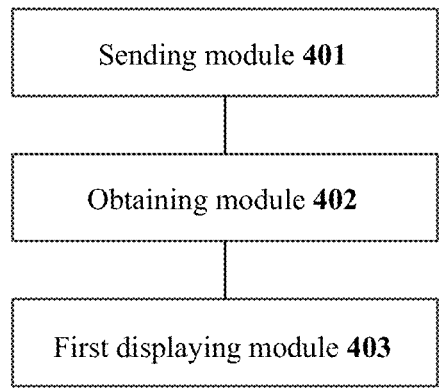
FIG. 7 is a schematic structural diagram of a device for displaying new media information according to some embodiments.

Referring to FIG. 7, a schematic structural diagram of a device for displaying new media information according to some embodiments is shown.

In some embodiments, the device for displaying new media information includes: a sending module 401 configured to: receive search information input by a user using a search engine, and send the search information to a server; an obtaining module 402 configured to obtain, from a search result returned by the server, element data of new media information related to the search information; and a first displaying module 403 configured to display, in a current search result page of the search engine, the element data of the new media information in a new media display format, where the element data is data that is directly displayable without a page jump in response to an operation of the user on the element data.

In some embodiments, the device for displaying new media information is configured to implement corresponding methods for displaying new media information in the foregoing plurality of method embodiments, and has beneficial effects of corresponding method embodiments. Details are not described herein again.

Figure 8:
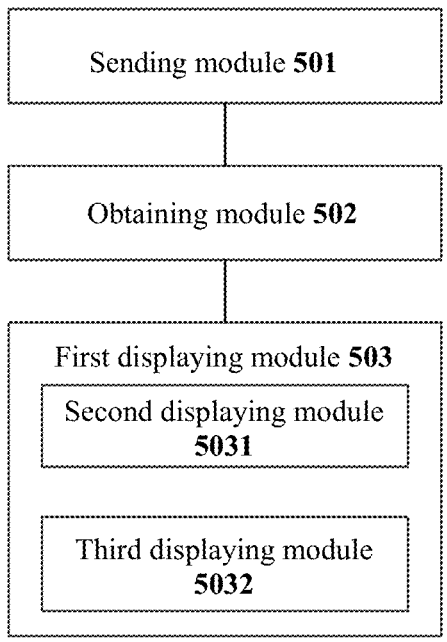
FIG. 8 is a schematic structural diagram of a device for displaying new media information according to some embodiments.

Referring to FIG. 8, a schematic structural diagram of a device for displaying new media information according to some embodiments is shown.

In some embodiments, the device for displaying new media information includes: a sending module 501 configured to: receive search information input by a user using a search engine, and send the search information to a server; an obtaining module 502 configured to obtain, from a search result returned by the server, element data of new media information related to the search information; and a first displaying module 503 configured to display, in a current search result page of the search engine, the element data of the new media information in a new media display format, where the element data is data that is directly displayable without a page jump in response to an operation of the user on the element data.

In some embodiments, the element data includes text data of new media and/or rich media data of new media. The first displaying module 503 includes: a second displaying module 5031 configured to display, in a first display area of a new media display area of the current search result page, the text data of the new media in a first specified format; and a third displaying module 5032 configured to display, in a second display area of a new media display area of the current search result page, the rich media data of new media in a second specified format.

In some embodiments, the text data of the new media includes at least one of the following: a title of the new media, a content body of the new media, comment information of the new media, and interactive question-and-answer information of the new media.

In some embodiments, the rich media data of the new media includes at least one of the following: an image of the new media, a video frame sequence of the new media, and an article link of the new media.

In some embodiments, the obtaining module 502 is configured to: analyze the search result returned by the server, and parse the element data from the new media information in response to determining according to an analysis result that the search result corresponds to the new media information; or receive the search result returned by the server, where the search result includes the element data obtained after parsing the new media information that matches the search information; and obtain the element data of the new media information from the search result.

In some embodiments, the device for displaying new media information is configured to implement corresponding methods for displaying new media information in the foregoing plurality of method embodiments, and has beneficial effects of corresponding method embodiments. Details are not described herein again.

Figure 9:
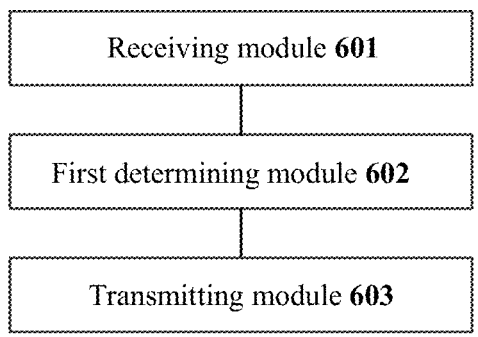
FIG. 9 is a schematic structural diagram of a device for displaying new media information according to some embodiments.

Referring to FIG. 9, a schematic structural diagram of a device for displaying new media information according to some embodiments is shown.

In some embodiments, the device for displaying new media information includes: a receiving module 601 configured to receive search information sent by a search engine input by a user; a first determining module 602 configured to determine a search result associated with the search information; and a transmitting module 603 configured to transmit the search result to the search engine, for the search engine to obtain, from the search result, element data of new media information related to the search information, and to display, in a current search result page, the element data of the new media information in a new media display format, where the element data is data that is directly displayable without a page jump in response to an operation of the user on the element data.

In some embodiments, the device for displaying new media information is configured to implement corresponding methods for displaying new media information in the foregoing plurality of method embodiments, and has beneficial effects of corresponding method embodiments. Details are not described herein again.

Figure 10:
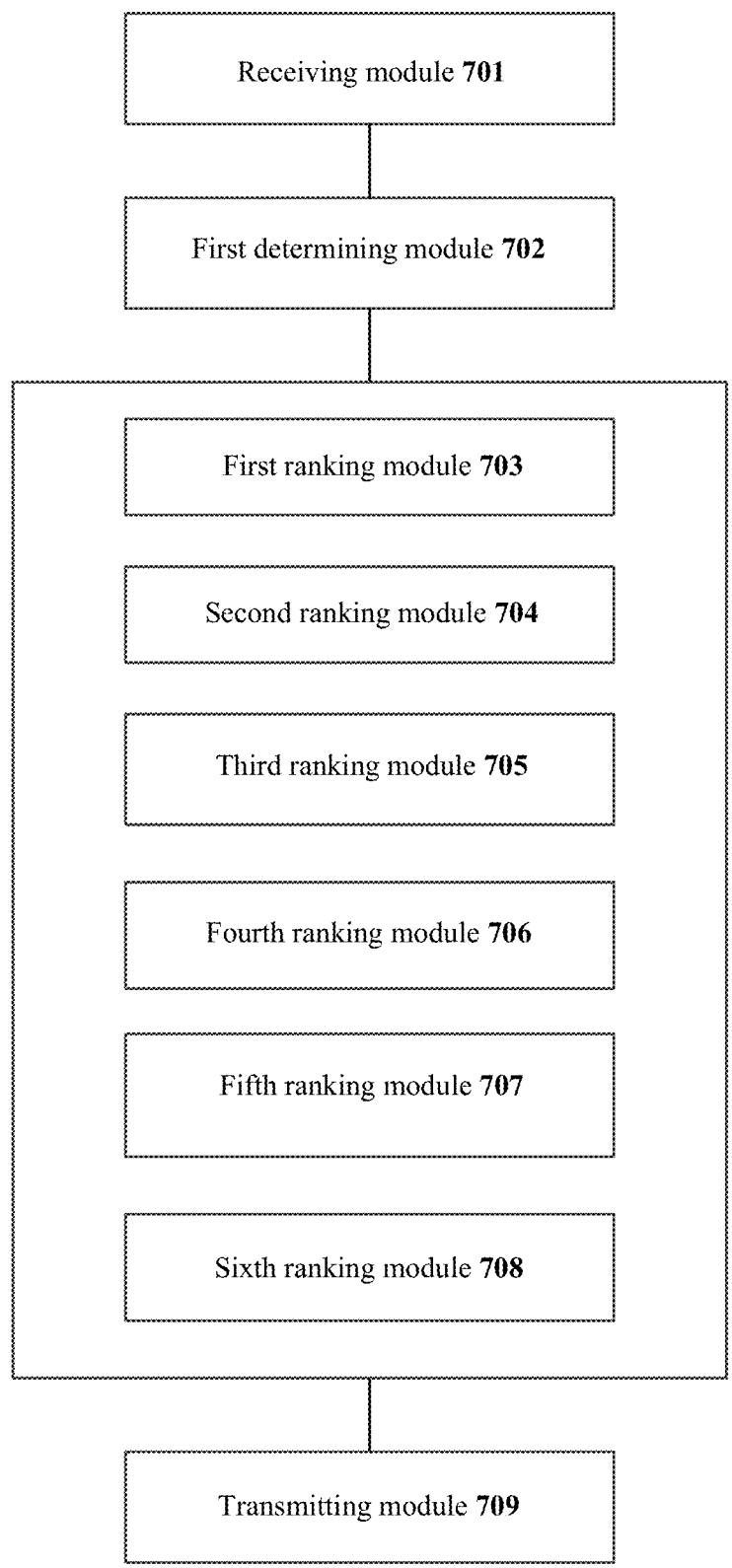
FIG. 10 is a schematic structural diagram of a device for displaying new media information according to some embodiments.

Referring to FIG. 10, a schematic structural diagram of a device for displaying new media information according to some embodiments is shown.

In some embodiments, the device for displaying new media information includes: a receiving module 701 configured to receive search information sent by a search engine input by a user; a first determining module 702 configured to determine a search result associated with the search information; and a transmitting module 709 configured to transmit the search result to the search engine, for the search engine to obtain, from the search result, element data of new media information related to the search information, and to display, in a current search result page, the element data of the new media information in a new media display format, where the element data is data that is directly displayable without a page jump in response to an operation of the user on the element data.

In some embodiments, after the first determining module 702, the device further includes: a first ranking module 703 configured to: rank the new media information based on a quantity of comments associated with the new media information, to determine a ranking result of the new media information; a second ranking module 704 configured to: rank the new media information based on a number of times the new media information is forwarded, to determine a ranking result of the new media information; a third ranking module 705 configured to: rank the new media information based on a type of rich media data included in the new media information, to determine a ranking result of the new media information; a fourth ranking module 706 configured to: rank the new media information based on a publishing time of the new media information, to determine a ranking result of the new media information; a fifth ranking module 707 configured to: determine a similarity between the search information and a title of new media included in the new media information, and rank the new media information based on the similarity between the search information and the title of the new media, to determine a ranking result of the new media information; or a sixth ranking module 708 configured to: determine a similarity between the search information and a content body of new media included in the new media information, and rank the new media information based on the similarity between the search information and the content body of the new media, to determine a ranking result of the new media information.

In some embodiments, the fifth ranking module 707 is configured to: segment the title of the new media to determine segmented words of the title of the new media; generate, based on the segmented words of the title of the new media, a first vector representing the title of the new media; segment a content of the search information to determine segmented words of the search information; generate, based on the segmented words of the search information, a second vector representing the search information; and determine the similarity between the search information and the title of the new media based on the first vector and the second vector.

In some embodiments, the sixth ranking module 708 is configured to: segment a content of the search information to determine segmented words of the search information; generate, based on the segmented words of the search information, a second vector representing the search information; segment a content body of the new media to determine segmented words of the content body of the new media; generate, based on the segmented words of the content body of the new media, a third vector representing the content body of the new media; and determine the similarity between the search information and the content body of the new media based on the second vector and the third vector.

In some embodiments, the transmitting module 709 is configured to transmit the new media information to the search engine based on the ranking result of the new media information.

In some embodiments, the device for displaying new media information is configured to implement corresponding methods for displaying new media information in the foregoing plurality of method embodiments, and has beneficial effects of corresponding method embodiments. Details are not described herein again.

Figure 11:
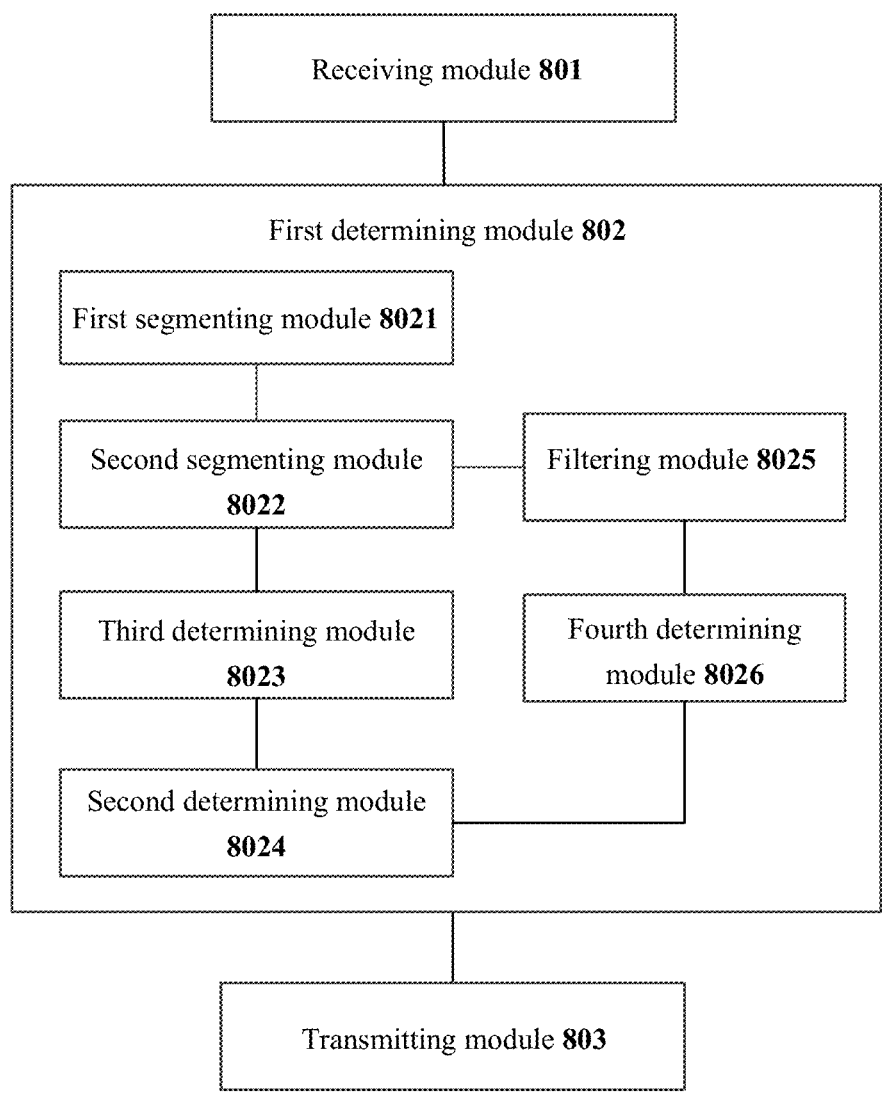
FIG. 11 is a schematic structural diagram of a device for displaying new media information according to some embodiments.

Referring to FIG. 11, a schematic structural diagram of a device for displaying new media information according to some embodiments is shown.

In some embodiments, the device for displaying new media information includes: a receiving module 801 configured to receive search information sent by a search engine input by a user; a first determining module 802 configured to determine a search result associated with the search information; and a transmitting module 803 configured to transmit the search result to the search engine, for the search engine to obtain, from the search result, element data of new media information related to the search information, and to display, in a current search result page, the element data of the new media information in a new media display format, where the element data is data that is directly displayable without a page jump in response to an operation of the user on the element data.

In some embodiments, the search result includes new media information that matches the search information or the element data obtained after parsing the new media information that matches the search information.

In some embodiments, the first determining module 802 includes: a second determining module 8024 configured to determine that the new media information matches the search information in response to determining that the search information matches a title of new media included in the new media information.

In some embodiments, in addition to the second determining module 8024, the first determining module 802 further includes: a first segmenting module 8021 configured to segment the title of the new media to determine segmented words of the title of the new media; a second segmenting module 8022 configured to segment a content of the search information to determine segmented words of the search information; and a third determining module 8023 configured to determine that the search information matches the title of the new media if the segmented words of the title of the new media include the segmented words of the search information.

In some embodiments, after the second segmenting module 8022, the first determining module 802 further includes: a filtering module 8025 configured to perform stop word filtering on the segmented words of the search information, to obtain filtered segmented words; and a fourth determining module 8026 configured to determine that the search information matches the title of the new media if the segmented words of the title of the new media include the filtered segmented words.

In some embodiments, the device for displaying new media information is configured to implement corresponding methods for displaying new media information in the foregoing plurality of method embodiments, and has beneficial effects of corresponding method embodiments. Details are not described herein again.

Figure 12:
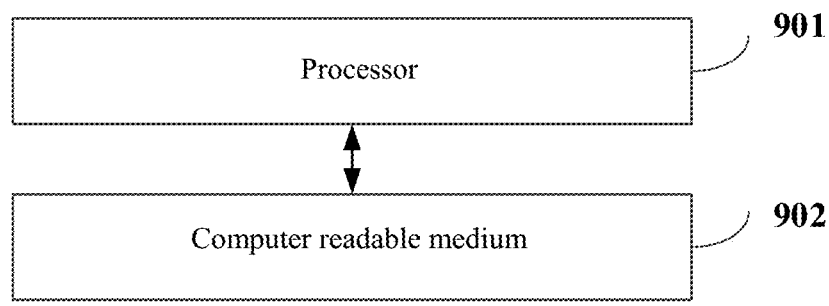
FIG. 12 is a schematic structural diagram of an electronic device according to some embodiments.

FIG. 12 is a schematic structural diagram of an electronic device according to some embodiments. The electronic device may include: one or more processors 901; and a computer readable medium 902 configured to store one or more programs; when the one or more programs are executed by the one or more processors, the one or more processors implementing the method for displaying new media information according to the foregoing embodiments.

Figure 13:
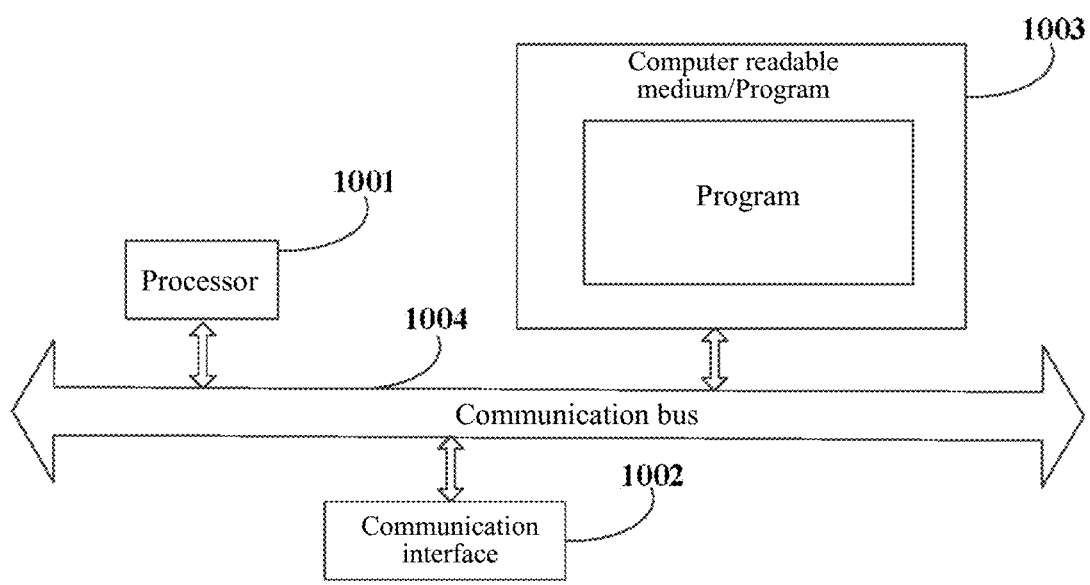
FIG. 13 is a hardware structure of an electronic device according to some embodiments.

FIG. 13 is a hardware structure of an electronic device according to some embodiments. As shown in FIG. 13, the hardware structure of the electronic device may include a processor 1001, a communication interface 1002, a computer readable medium 1003, and a communication bus 1004.

Communication between the processor 1001, the communication interface 1002, and the computer readable medium 1003 is implemented through the communication bus 1004.

In some embodiments, the communication interface 1002 may be an interface of a communication module, for example, an interface of a GSM module.

The processor 1001 may be configured to: receive search information input by a user using a search engine, and send the search information to a server; obtain, from a search result returned by the server, element data of new media information related to the search information; and display, in a current search result page of the search engine, the element data of the new media information in a new media display format, wherein the element data is data that is directly displayable without a page jump in response to an operation of the user on the element data. In addition, the processor 1001 may also be configured to: receive search information sent by a search engine input by a user; determine a search result associated with the search information; and transmit the search result to the search engine, for the search engine to obtain, from the search result, element data of new media information related to the search information, and to display, in a current search result page, the element data of the new media information in a new media display format, wherein the element data is data that is directly displayable without a page jump in response to an operation of the user on the element data.

The processor 1001 may be a general-purpose processor, including a central processing unit (CPU), a network processor (NP), and the like, and may also be a digital signal processor (DSP), an application-specific integrated circuit (ASIC), a field programmable gate array (FPGA) or other programmable logical devices, discrete gate or transistor logical devices, and discrete hardware components. The processor 1301 may implement or perform the methods, the steps, and logical block diagrams that are disclosed in the embodiments of the present specification. The general-purpose processor may be a microprocessor, or the processor may also be any conventional processor or the like.

The computer readable medium 1003 may be, but is not limited to, a random access memory (RAM), a read-only memory (ROM), a programmable read-only memory (PROM), an erasable programmable read-only memory (EPROM), an electrically erasable programmable read-only memory (EEPROM), or the like.

According to the embodiments of the present disclosure, the processes described above with reference to the flowcharts may be implemented as computer software programs. For example, an embodiment of the present disclosure includes a computer program product, and the computer program product includes a computer program stored in a computer readable medium. The computer program includes program code used for performing the methods shown in the flowcharts. In such an embodiment, by using a communication part, the computer program may be downloaded and installed from a network, and/or installed from a removable medium. When the computer program is executed by a CPU, the foregoing functions defined in the method of the present specification are executed. The computer readable medium in the present specification may be a computer readable signal medium or a computer readable storage medium or any combination thereof. The computer readable medium may be, for example, but not limited to, an electric, magnetic, optical, electromagnetic, infrared, or semi-conductive system, apparatus, or device, or any combination thereof. More specific examples of the computer readable storage medium may include but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a compact disk read-only memory (CD-ROM), an optical storage medium, a magnetic storage medium, or any appropriate combination thereof. In the present specification, the computer readable storage medium may be any tangible medium including or storing a program, and the program may be used by or in combination with an instruction execution system, apparatus, or device. In the present specification, the computer readable signal medium may include a data signal transmitted in a baseband or as part of a carrier, and stores computer readable program code. The propagated data signal may be in a plurality of forms, including, but not limited to, an electromagnetic signal, an optical signal, or any appropriate combination thereof. The computer readable signal medium may alternatively be any computer readable medium other than the computer readable storage medium. The computer readable medium may be configured to send, propagate, or transmit a program configured to be used by or in combination with an instruction execution system, apparatus, or device. The program code included in the computer readable medium may be transmitted by using any suitable medium, including but not limited to, via wireless transmission, a wire, a cable, radio frequency (RF) or the like, or any suitable combination of thereof. The computer program code configured to execute the operations of the present specification may be written by using one or more programming languages or a combination thereof. The programming languages include an object-oriented programming language such as Java, Smalltalk and C++, and also include a conventional procedural programming language such as "C" or similar programming languages. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a user computer through any type of network including a local area network (LAN) or a wide area network (WAN), or may be connected to an external computer (for example, through the Internet by using an Internet service provider).

The flowcharts and block diagrams in the accompanying drawings show architectures, functions, and operations that may be implemented for the system, the method, and the computer program product according to the embodiments of the present specification. In this regard, each box in a flowchart or a block diagram may represent a module, a program segment, or a part of code. The module, the program segment, or the part of code includes one or more executable instructions used for implementing specified logic functions. Although the steps are described in particular orders in the foregoing embodiments, the orders are merely exemplary. During implementations, some steps may be omitted, added, or performed in a different order. In some alternative implementations, functions shown in blocks may also be performed in an order different from that shown in the accompanying drawings. For example, two consecutive blocks may basically be performed simultaneously in fact, or sometimes may also be performed in a reverse order, depending on the related functions. Each block in the block diagram and/or the flowchart and a combination of the blocks in the block diagram and/or the flowchart may be implemented by using a dedicated hardware-based system that performs a specified function or operation, or may be implemented by using a combination of dedicated hardware and computer instructions.

The modules described in the embodiments of the present specification may be implemented through software or hardware. The modules described may alternatively be disposed in a processor, for example, as in the following description: a processor including a sending module, an obtaining module, and a first displaying module. Names of the modules do not constitute a limitation on the modules in some cases. For example, the sending module may also be described as "a module configured to receive search information input by a user using a search engine, and send the search information to a server."

In some embodiments, the various modules of the devices or apparatuses shown in FIG. 7 to FIG. 11 may be implemented as software instructions or a combination of software and hardware. For example, the apparatus (or referred to as system) for displaying new media information described with reference to any of FIG. 7 to FIG. 11 may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the apparatus for displaying new media information may include a server, a mobile phone, a tablet computer, a laptop computer, another computing device, or a combination of one or more of these computing devices.

According to another aspect, the present specification further provides a computer readable medium on which a computer program is stored, and when executed by a processor, the program implements the method for displaying new media information according to the disclosed embodiments.

According to another aspect, the present specification further provides a computer readable medium. The computer readable medium may be included in the apparatus described in the foregoing embodiments, or may exist alone and is not disposed in the apparatus. The computer readable medium store one or more programs, which, when executed by the apparatus, cause the apparatus to: receive search information input by a user using a search engine, and send the search information to a server; obtain, from a search result returned by the server, element data of new media information related to the search information; and display, in a current search result page of the search engine, the element data of the new media information in a new media display format, wherein the element data is data that is directly displayable without a page jump in response to an operation of the user on the element data. In addition, the one or more programs further cause the apparatus to: receive search information sent by a search engine input by a user; determine a search result associated with the search information; and transmit the search result to the search engine, for the search engine to obtain, from the search result, element data of new media information related to the search information, and to display, in a current search result page, the element data of the new media information in a new media display format, wherein the element data is data that is directly displayable without a page jump in response to an operation of the user on the element data.

The expressions "first," "second," "the first," and "the second" used in the implementations of the present disclosure may define various components and do not imply any order and/or importance, but the expressions are not intended to limit the corresponding components. The foregoing expressions are merely used for distinguishing one element from another element. For example, the first user equipment and the second user equipment represent different user equipment, although the two are both user equipment. For example, the first element may be referred to as a second element, and similarly the second element may be referred to as a first element, without departing from the scope of the present disclosure.

When one element (for example, a first element) is described as "operably or communicatively connected" or "operably or communicatively connected to" or "connected to" another element (for example, a second element), the one element is connected to the other element directly or indirectly via another element (for example, a third element). Conversely, when an element (for example, a first element) is described as "directly connected" or "directly coupled" to another element (a second element), no intervening element (for example, a third element) exists between the two.

The foregoing descriptions are merely some embodiments of the present specification and descriptions of the technical principles used. A person skilled in the art should understand that the scope of the present specification is not limited to the technical solutions that are formed by the foregoing particular combinations of technical features, but shall also encompass other technical solutions formed by arbitrarily combining the foregoing technical features or equivalent features thereof without departing from the foregoing inventive concept. For example, technical solutions formed by replacing the foregoing features with technical features having similar functions disclosed in the present specification (but not limited thereto) are also included.

What is claimed is:

1. A computer-implemented method, comprising:
   receiving, by a search engine, search information input by a user using the search engine;
   sending, by the search engine, the search information to a server, wherein the server has crawled one or more new media websites which are not discoverable by the search engine;
   obtaining, by the search engine, search results returned by the server based on the search information, the search results including a plurality of pieces of new media information from the one or more new media websites crawled by the server;
   ranking, by the search engine, the plurality of pieces of new media information based on a quantity of types of rich media data in each of the plurality of pieces of new media information, wherein
      the rich media data being one or more of the following types: a video type, an image type, and an article type,
      one or more of the plurality of pieces of new media information having two or more types of rich media data, and
      in response to a determination that two pieces of new media information having a same quantity of types of rich media data, ranking a first piece of the new media information having at least the video type higher than a second piece of the new media information having at least the image type; and
   displaying, by the search engine in a current search result page of the search engine, the plurality of ranked pieces of new media information in a new media display format that is directly displayable upon an interaction by the user without a page jump.

2. The method according to claim 1, further comprising parsing, by the search engine, each of the plurality of pieces of new media information to obtain element data, wherein
   the element data comprises text data of the new media information and/or the rich media data of the new media information; and
   the displaying comprises:
      displaying, in a first display area of a new media display area of the current search result page, the text data of the new media information in a first specified format; and
      displaying, in a second display area of the new media display area of the current search result page, the rich media data of the new media information in a second specified format.

3. The method according to claim 2, wherein the text data of the new media information comprises at least one of the following:
   a title of the new media information,
   a content body of the new media information,
   comment information of the new media information, and
   interactive question-and-answer information of the new media information.

4. The method according to claim 2, wherein the rich media data of the new media information comprises at least one of the following:

an image of the new media information and a video frame sequence of the new media information.

5. A method for searching new media information, comprising:
receiving, by a server, search information sent by a search engine, wherein the search information is inputted by a user into the search engine;
crawling, by the server based on the search information, one or more new media websites to obtain search results comprising a plurality of pieces of new media information matching the search information, wherein the one or more new media websites are not discoverable by the search engine;
ranking, by the server, the plurality of pieces of new media information in the search results based on a quantity of types of rich media data in each of the plurality of pieces of new media information, wherein
the rich media data being one or more of the following types: a video type, an image type, and an article type,
the rich media data being one or more of the following types: a video type, an image type, and an article type,
one or more of the plurality of pieces of new media informaiton having two or more types of rich media data, and
in response to a determination that two nieces of new media information having a same quantity of types of rich media data, ranking a first piece of the new media information having at least the video type higher than a second piece of the new media information having at least the image type;
transmitting the search results to the search engine for display; and
displaying, by the search engine in a current search result page of the search engine, the plurality of ranked pieces of new media information in a new media display format that is directly displayable upon an interaction by the user without a page jump.

6. The method according to claim 5, wherein the crawling of the one or more new media websites comprises:
searching for the plurality of pieces of new media information comprising a title of new media information matching the search information.

7. The method according to claim 6, wherein before the searching for the plurality of pieces of new media information, the method further comprises;
segmenting the title of the new media information to determine segmented words of the title of the new media information;
segmenting the search information to determine segmented words of the search information; and
determining that the search information matches the title of the new media information if the segmented words of the title of the new media information comprise the segmented words of the search information.

8. The method according to claim 7, wherein after the segmenting of the search information, the method further comprises:
performing stop word filtering on the segmented words of the search information, to obtain filtered segmented words; and
determining that the search information matches the title of the new media information if the segmented words of the title of the new media information comprise the filtered segmented words.

9. The method according to claim 5, wherein the ranking of the plurality of pieces of new media information further comprises:
ranking the plurality of pieces of new media information based on a quantity of comments associated with the plurality of pieces of new media information, to determine a ranking result of the plurality of pieces of new media information;
ranking the plurality of pieces of new media information based on a number of times the plurality of pieces of new media information is forwarded, to determine the ranking result of the plurality of pieces of new media information;
ranking the plurality of pieces of new media information based on a publishing time of the plurality of pieces of new media information, to determine the ranking result of the plurality of pieces of new media information;
determining a similarity between the search information and a title of new media comprised in the plurality of pieces of new media information, and ranking the plurality of pieces of new media information based on the similarity between the search information and the title of the plurality of pieces of new media information, to determine the ranking result of the plurality of pieces of new media information; or
determining a similarity between the search information and a content body of the plurality of pieces of new media information comprised in the plurality of pieces of new media information, and ranking the plurality of pieces of new media information based on the similarity between the search information and the content body of the plurality of pieces of new media information, to determine the ranking result of the plurality of pieces of new media information.

10. The method according to claim 9, wherein the determining of the similarity between the search information and the title of new media information comprised in the plurality of pieces of new media information comprises:
segmenting the title of the new media information to determine segmented words of the title of the new media information;
generating, based on the segmented words of the title of the new media information, a first vector representing the title of the new media information;
segmenting the search information to determine segmented words of the search information;
generating, based on the segmented words of the search information, a second vector representing the search information; and
determining the similarity between the search information and the title of the new media information based on the first vector and the second vector.

11. The method according to claim 9, wherein the determining of the similarity between the search information and the content body of new media information comprised in the plurality of pieces of new media information comprises:
segmenting the search information to determine segmented words of the search information;
generating, based on the segmented words of the search information, a second vector representing the search information;
segmenting the content body of the new media information to determine segmented words of the content body of the new media information;

generating, based on the segmented words of the content body of the new media information, a third vector representing the content body of the new media information; and determining the similarity between the search information and the content body of the new media information based on the second vector and the third vector.

12. The method according to claim 5, wherein the transmitting the search results to the search engine comprises:

transmitting the plurality of ranked pieces of new media information to the search engine.

13. A non-transitory computer-readable storage medium of a search engine for searching new media information, the storage medium configured with instructions executable by one or more processors to cause the one or more processors to perform operations comprising:

receiving, by the search engine, search information inputted by a user using the search engine;

sending, by the search engine, the search information to a server, wherein the server has crawled one or more new media websites which are not discoverable by the search engine;

obtaining, by the search engine, search results returned by the server based on the search information, the search results including a plurality of pieces of new media information from the one or more new media websites crawled by the server;

ranking, by the search engine, the a plurality of pieces of new media information based on a quantity of types of rich media data in each of the plurality of pieces of new media information, wherein the rich media data being one or more of the following types: a video type, an image type, and an article type, one or more of the plurality of pieces of new media information having two or more types of rich media data, and in response to a determination that two pieces of new media information having a same quantity of types of rich media data, ranking a first piece of the new media information having at least the video type higher than a second piece of the new media information having at least the image type; and displaying, by the search engine in a current search result page of the search engine, the plurality of ranked pieces of new media information in a new media display format that is directly displayable upon an interaction by the user without a page jump.

14. The storage medium according to claim 13, wherein the operations further comprise parsing each of the plurality of pieces of new media information to obtain element data, wherein the element data comprises text data of the new media information and/or the rich media data of the new media information; and the displaying comprises:

displaying, in a first display area of a new media display area of the current search result page, the text data of the new media information in a first specified format; and displaying, in a second display area of the new media display area of the current search result page, the rich media data of the new media information in a second specified format.

15. The storage medium according to claim 14, wherein the text data of the new media information comprises at least one of the following:

a title of the new media information, a content body of the new media information, comment information of the new media information, and interactive question-and-answer information of the new media information.

16. The storage medium according to claim 14, wherein the rich media data of the new media information comprises at least one of the following: an image of the new media information and a video frame sequence of the new media information.

* * * * *